Aug. 4, 1953    R. P. TRAINER    2,647,738
HEATING POWDERED MATERIAL
Filed Dec. 8, 1950
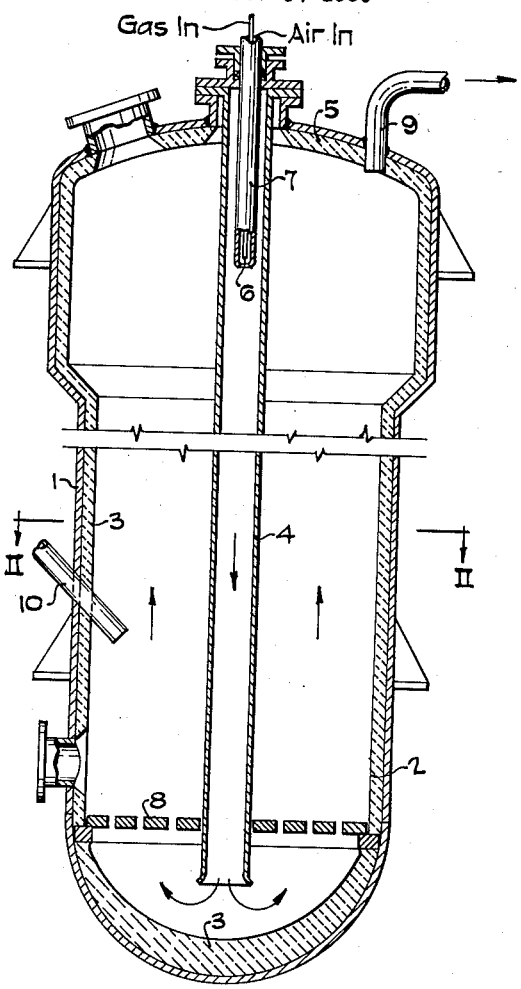
Fig. I
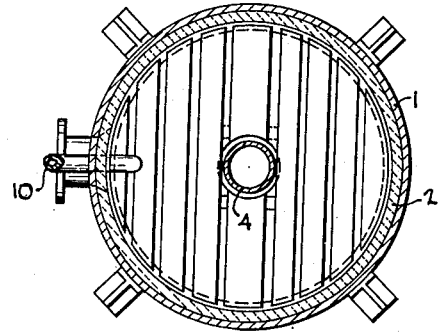
Fig. II
Inventor:
Richard P. Trainer
By his Attorney Patented Aug. 4, 1953

2,647,738

UNITED STATES PATENT OFFICE 2,647,738

HEATING POWDERED MATERIAL

Richard P. Trainer, Amityville, N. Y., assignor to Shell Development Company, Emeryville, Calif., a corporation of Delaware Application December 8, 1950, Serial No. 199,799

2 Claims. (Cl. 263—43)

This invention relates to an improved apparatus and method for heating powdered materials by contact with hot combustion gases.

In many cases it is desired to heat a powdered material by direct contact with hot combustion gases. This can be done in rotating kilns, furnaces of the Herreshoff type, and other such conventional equipment. These methods are, however, not well suited for many cases and particularly where it is desired that the powder be heated and maintained at a very uniform temperature. For such applications, it is more advantageous to heat the powder while maintaining it in the form of a bed which is agitated and retained in a fluidized (pseudo liquid) state by passage of the hot gases. In one such method the combustion is carried out in a separate combustion zone and the hot combustion gases are then passed up through the bed of the powder. This method is quite suitable when only moderate temperatures are desired. Heat losses are usually high, however, and severe engineering difficulties are encountered, particularly in cases where higher temperatures are desired.

Where higher temperatures are required it is advantageous to effect the combustion of the fuel within the bed of powder as described in U. S. Patent No. 2,493,498. This method allows high uniform temperatures to be accurately and easily maintained but these advantages are obtained at the cost of decreased combustion efficiency.

An object of the present invention is to provide an apparatus and method whereby various powdered solid materials may be heated in a more practicable and more efficient manner with hot combustion gases. A particular object of the invention is to provide a method and apparatus whereby heat losses are minimized. Another more particular object is to provide an apparatus which is simpler and less costly and yet is capable of more efficient heat utilization.

One preferred form of the apparatus of the present invention is illustrated in the attached drawing wherein Figure I is a sectional elevation and Figure II shows a section in plan of the same apparatus taken at the plane II—II. Referring to the drawing, the apparatus comprises an outer shell 1 which is preferably cylindrical and preferably has a length of at least twice the diameter. The shell may be of the same diameter throughout its length, or it may be somewhat constricted near the top. On the other hand, if it is desired that the powder remain in the apparatus for a relatively long time, the shell is preferably enlarged near the top, as illustrated. If the desired temperature is relatively low, the shell may be insulated on the outside. If a high temperature is desired, it is preferable to line the inside of the shell with a suitable refractory material 2. In some cases, no insulation is necessary and, in some cases, as will be pointed out the shell is jacketed. The bottom of the vessel is preferably rounded and is provided with a substantial thickness of refractory brick or other refractory material capable of withstanding the impingement of hot combustion gases. This refractory lining is preferably lens-shaped, somewhat as illustrated, to provide maximum protection directly below the point of entry of the combustion gases and to facilitate the even flow of the combustion gases over the bottom of the vessel.

A long cylindrical tube 4, preferably of stainless steel, extends down through the top closure 5 to a point near the bottom of the vessel. In the case illustrated, the tube extends directly downward, but it may, if desired, take a more indirect path, e. g., spiral, to increase the heat exchange surface. In some cases, the tube may be plain, as illustrated, but in many cases, it is preferably provided with fins to increase the conduction of heat from the center to the outside. The lower end of the tube 4 may be flared as illustrated. A burner 6 is suspended by a line 7 in the axis of the tube 4 near the top. The line 7 is passed through a gland in the top closure of tube 4 in such a manner that the burner may be raised or lowered as required for adjustment. A grid 8, adapted to distribute the combustion gases over the cross-sectional area of the vessel, is located near the bottom of the vessel immediately above the lower end of tube 4. The grid 8, which is in essence a means for distributing hot combustion gases over the cross-sectional area of the vessel, may be constructed of a series of spaced bars or plates, as illustrated. It may also be constructed of drilled or slotted plates or even of suitable screen or a porous medium if desired. A conduit 9 is provided at the top of the vessel to remove spent combustion gases. In cases where it is desired to retain the powder in the apparatus for a relatively long period of time, i. e., retain a very high level, a cyclone separator or other equivalent device may be provided and arranged within the upper part of the shell. A line 10 is provided for charging the powdered material to the vessel. If desired, a separate line, not shown, may be provided for removing the fluidized powder directly from the bed.

In operation, the vessel is charged with the powdered material in such an amount that the upper level of the bed of material is near the top of the vessel when fluidized by the combustion gases. The burner 6 is adjusted such that the high temperature combustion zone is just below the level of the fluid bed of powder. The fluid bed therefore cools the tube 4 and prevents it from burning out. The hot combustion gases are further cooled during passage down through the lower part of tube 4. In a typical case the combustion zone is at about 3000° F. and is located about two feet below the level of the fluidized bed; the combustion gases then pass downward through tube 4 at a velocity of about 150 feet per second and leave the lower end of the tube at a temperature of about 2300° F. The hot combustion gases leaving tube 4 impinge upon the bottom refractory lining and then pass up through the grid 8 into the bed of powder.

The level of the fluid bed of powder changes with the velocity of the combustion gases passing up through the bed. In the case illustrated the level of the bed of powder tends to increase until an equilibrium level is reached at which point the gases leaving by line 9 carry in suspension the same quantity of the powder as is being fed to the apparatus by line 10. The powder may be recovered from the combustion gas by a cyclone separator (not shown) or by any other conventional device for separating and recovering solids from gases.

In the apparatus and operation just described the fuel, which may be gas, oil, powdered coal or the like, can be burned at high efficiency and the high heat created by efficient combustion is rapidly dissipated thereby allowing the combustion to be carried out in the simple tube as described. Thus the problem of heat loss and the problem of maintenance of a refractory lining in the combustion zone are eliminated. Also, as pointed out, the combustion gases are substantially cooled before contacting the powder. This is advantageous in many cases, particularly where overheating of the powder is to be avoided. Another advantage of the design is that the process may be started and stopped without difficulty. Upon stopping the process, the powder may substantially fill the space between the bottom and the grid but it does not fill the combustion zone nor plug the burner. Upon starting the operation, any powder below the grid is immediately carried up through the grid by the combustion gases.

The apparatus and method of the invention are not only applicable in those cases where it is the powder itself that is being treated, but it is also applicable in other cases where the powder serves merely as a heat exchange medium. For example, reactor tubes provided with suitable inlet and outlet manifolds may be placed in the fluid bed and thereby maintained at a very even temperature. Also, in place of providing tubular elements to be heated within the bed of powder, the outer shell of the vessel may be jacketed and the fluid to be heated, e. g., steam, may be heated while passing through the jacket. A contemplated application of this variation is, for example, in the production of vapors of materials which tend to decompose or react at temperatures only slightly above their vaporization temperatures. The depolymerization of certain polymers, e. g., methacrylic acid dimer is an example of such an application.

I claim as my invention:

1. An apparatus for heating powdered solids by direct contact with hot combustion gases which comprises in combination a vertically disposed cylindrical shell with top and bottom closures, said cylindrical shell defining a heating space, a refractory lining in the bottom closure, a conduit open at the bottom depending within said heating space from the top closure and extending downward to a point near the refractory lining of the bottom closure, a burner suspended near the top and within said conduit, and a gas distributing grid extending across the cross-sectional area of said shell at a point near the bottom and above the lower end of said conduit.

2. An apparatus according to claim 1 further characterized in that said burner is suspended in said conduit by a line passing through a gland allowing vertical adjustment of said burner.

RICHARD P. TRAINER.

References Cited in the file of this patent

UNITED STATES PATENTS

| Number | Name | Date |
|---|---|---|
| 1,927,493 | Hechenbleikner | Sept. 19, 1933 |
| 1,953,938 | Jaeger | Apr. 10, 1934 |
| 2,418,394 | Brown | Apr. 1, 1947 |
| 2,436,464 | Dornick | Feb. 24, 1948 |
| 2,540,806 | Berger, Jr. | Feb. 6, 1951 |

FOREIGN PATENTS

| Number | Country | Date |
|---|---|---|
| 588,743 | Great Britain | June 2, 1947 |